United States Patent [19]
Chang

[11] Patent Number: 6,029,687
[45] Date of Patent: Feb. 29, 2000

[54] ASSEMBLING STRUCTURE FOR BALANCE VALVE OF COLD/HOT WATER MIXING VALVE

[76] Inventor: Chia-Bo Chang, No. 335, Chang-Ting Rd., Lukang Town, Chanhua County, Taiwan

[21] Appl. No.: 09/199,803

[22] Filed: Nov. 25, 1998

[51] Int. Cl.⁷ .................................................. G05D 11/03
[52] U.S. Cl. ........................ 137/98; 137/100; 137/454.6; 137/315
[58] Field of Search .............................. 137/98, 100, 114, 137/315, 454.6, 607, 625.4, 625.41

[56] References Cited

U.S. PATENT DOCUMENTS

| | | | |
|---|---|---|---|
| 4,901,750 | 2/1990 | Nicklas et al. | 137/607 |
| 5,010,917 | 4/1991 | Iqbal | 137/454.6 |
| 5,355,966 | 10/1994 | Marty et al. | 137/454.6 |

*Primary Examiner*—Stephen Hepperle
*Attorney, Agent, or Firm*—Dougherty & Troxell

[57] ABSTRACT

An assembling structure for balance valve of cold/hot water mixing valve. The assembling structure includes a mixing valve cartridge a bottom wall of which is formed with a lower balance valve cavity above the cold and hot water incoming holes thereof, and a circular balance valve cover board formed with cold and hot water incoming holes and mixing water outgoing hole corresponding to the water holes of the cartridge. A lower surface of the balance valve cover board is formed with an upper balance valve cavity at the cold and hot water incoming holes thereof. The lower surface of the balance valve cover board is further formed with a sealing groove along the edges of the mixing water outgoing hole and the upper balance valve cavity. When the balance valve cover board is fixedly rested on the upper surface of the bottom wall of the cartridge, the cover board via a balance valve seal is sealedly positioned in the sealing groove and pressed by the bottom wall of the cartridge. Accordingly, the lower and upper balance valve cavities together form a leakproof space in which the balance valve is fixedly sealedly accommodated. In assembling procedure, the respective components are accurately located to facilitate the assembling operation.

3 Claims, 6 Drawing Sheets

ASSEMBLING STRUCTURE FOR BALANCE VALVE OF COLD/HOT WATER MIXING VALVE

BACKGROUND OF THE INVENTION

The present invention relates to an assembling structure for balance valve of cold/hot water mixing valve, and more particularly to an assembling structure for integrally assembling a cold/hot water adjusting/controlling unit with the water pressure balance valve.

U.S. patent application Ser. No. 09/109,005 "Balancing Valve Assembly of a Cold and Hot Water Mixing Valve" of the applicant discloses a cold and hot water mixing valve in which the bottom wall of the mixing valve cartridge is formed with a recess. A lower balance valve cavity is formed above the cold and hot water incoming holes in the recess. The bottom wall is further formed with a sealing groove along the edges of the water outgoing hole and the lower balance valve cavity. The mixing valve includes a balance valve cover board corresponding to the recess of the cartridge. The balance valve cover board is formed with cold and hot water incoming holes and water outgoing hole corresponding to the water holes of the cartridge. The balance valve cover board is formed with an upper balance valve cavity under the cold and hot water incoming holes corresponding to the lower balance valve cavity. The balance valve cover board is fixedly rested in the recess of the cartridge. The balance valve cover board via a balance valve seal is sealedly positioned in the sealing groove, whereby the lower and upper balance valve cavities together form a leakproof space in which the balance valve is fixedly sealedly accommodated. In assembling procedure, the respective components are firmly located and the assembling operation is facilitated.

According to the above structure, the recess of the bottom wall of the cartridge and the corresponding balance valve cover board are designed with a T-shape which makes it not easy to assemble the components. Moreover, the components are positioned on the bottom of the cylindrical cartridge, whereby it is difficult to align and install the balance valve, sealing ring and balance valve cover board. This leads to low production efficiency.

SUMMARY OF THE INVENTION

It is a primary object of the present invention to provide an assembling structure for balance valve of cold/hot water mixing valve, in which the balance valve cover board and the corresponding recess of the bottom wall of the mixing valve cartridge are simplified into a circular shape so as to facilitate the assembly of the balance valve cover board and the cartridge. In addition, the positions of the water incoming and outgoing holes and the balance valve cavities are modified in such a manner that the the depth of the upper balance valve cavity of the balance valve cover board is increased and the sealing groove is disposed on the surface of the bottom of the balance valve cover board. Accordingly, when assembled, the balance valve can be previously fitted on the sealing ring which is inserted into the sealing groove of the cover board. The balance valve is inserted into the upper balance valve cavity and is temporarily located. Then the mixing valve cartridge is reversed to push the cover board, sealing ring and balance valve together to the bottom wall of the cartridge. Therefore, during the assembling operation, the respective components can be precisely located so as to facilitate the assembling operation.

The present invention can be best understood through the following description and accompanying drawings, wherein:

DETAILED DESCRIPTION OF THE PREFERRED EMBODIMENT

Figure 1:
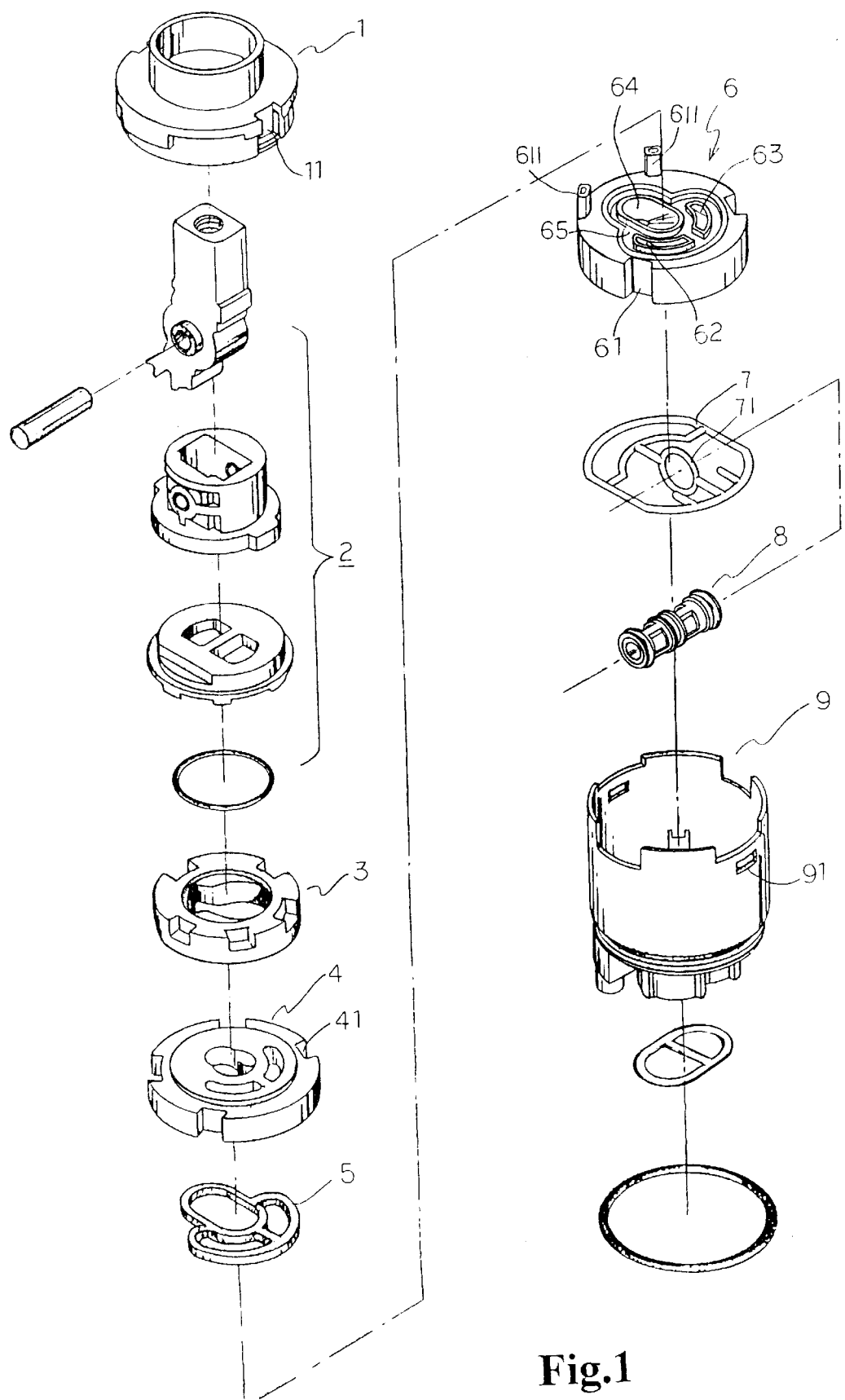
FIG. 1 is a perspective exploded view of the present invention.
Figure 2:
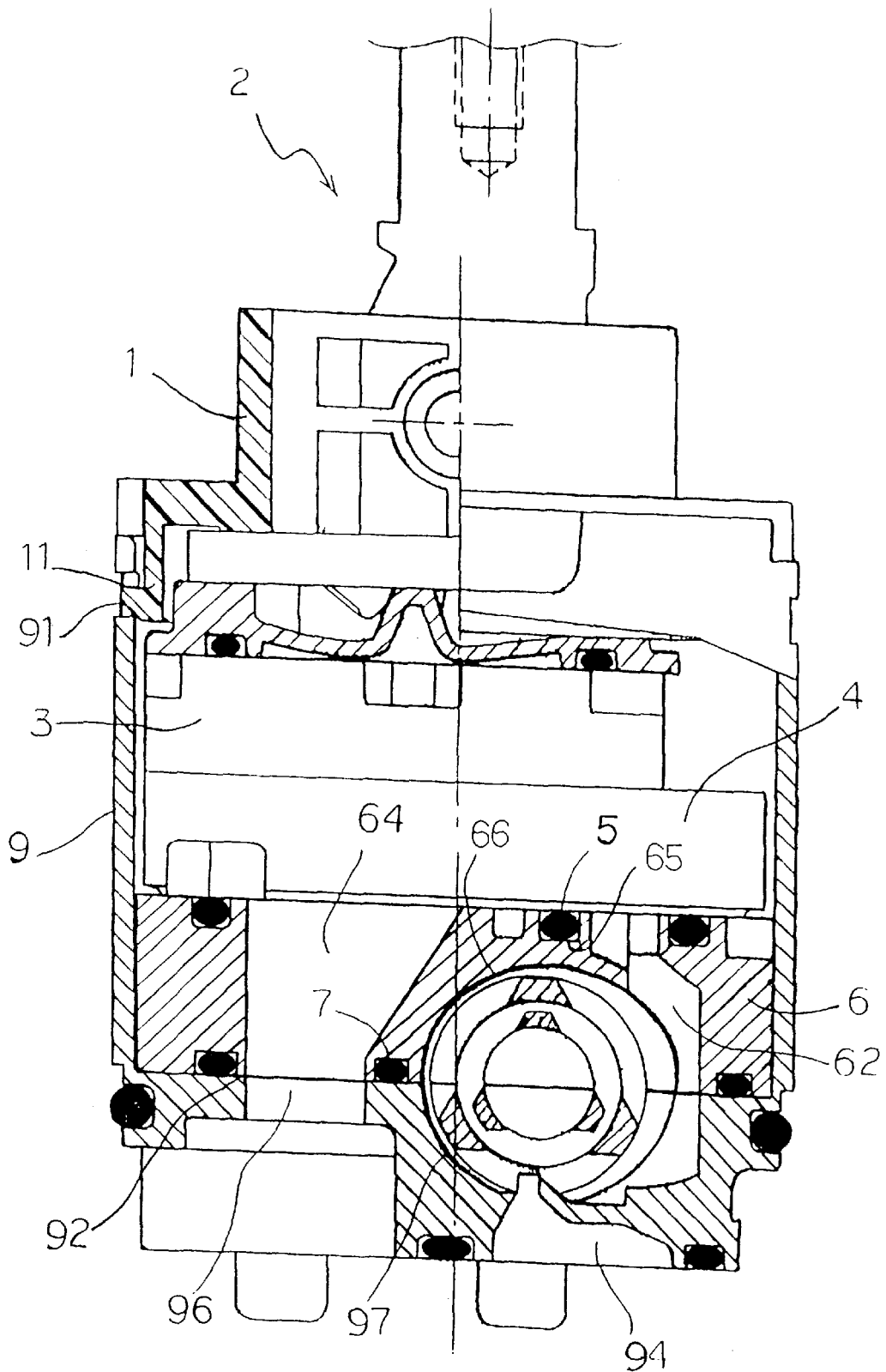
FIG. 2 is a sectional assembled view of the present invention, showing the connection between the components.
Figure 3:
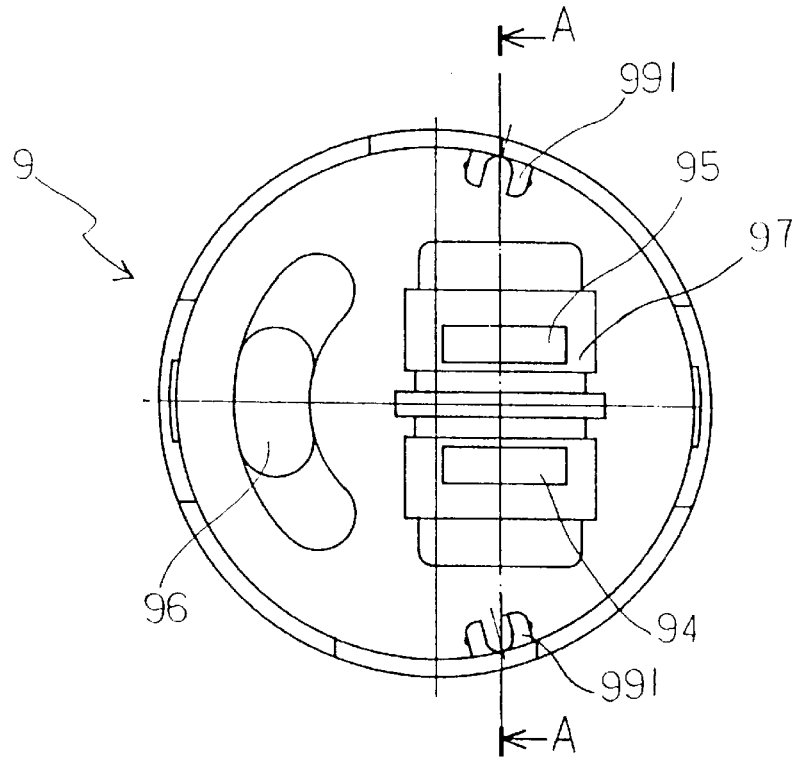
FIG. 3 is a top view of the cartridge of the present invention.
Figure 4:
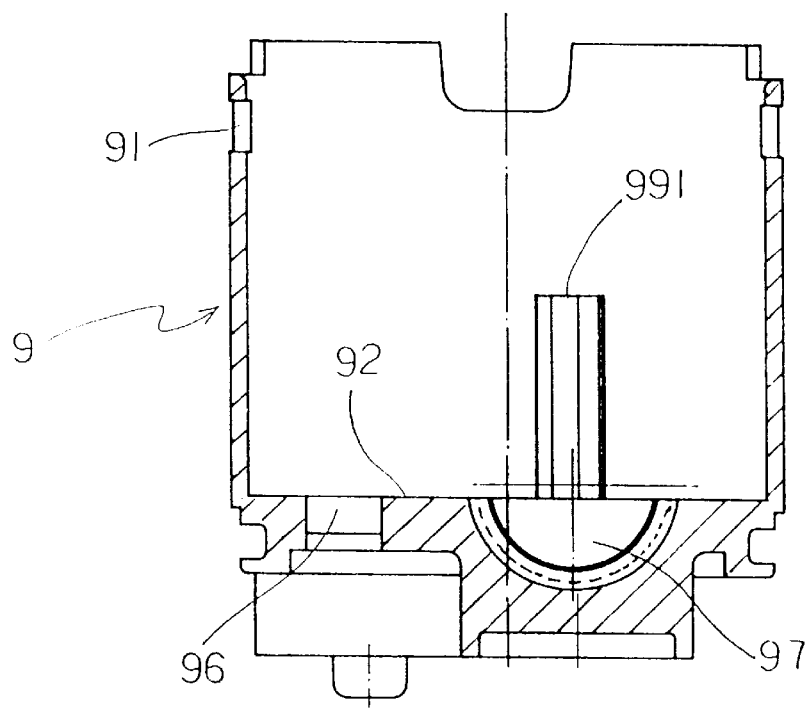
FIG. 4 is a totally sectional view according to FIG. 3.
Figure 5:
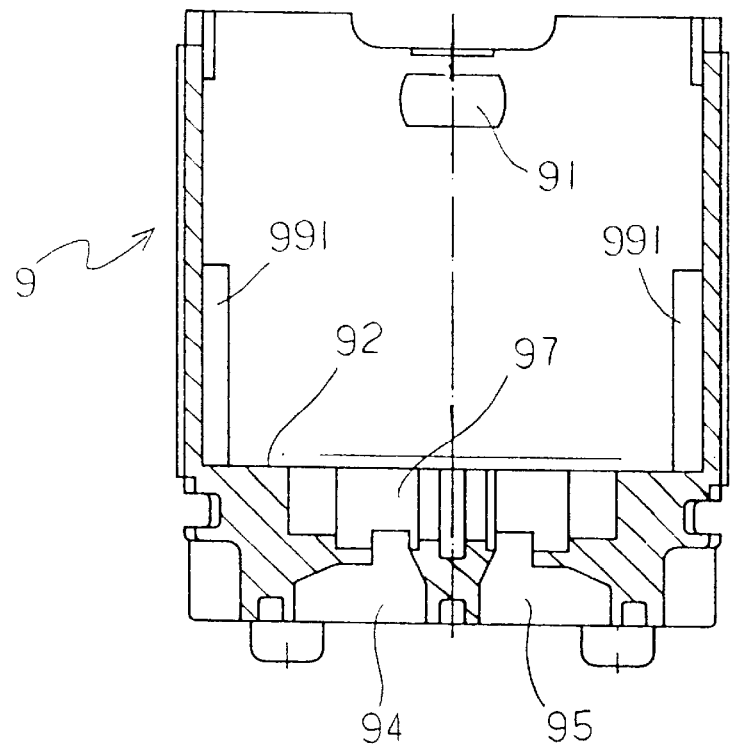
FIG. 5 is a sectional view taken along line A—A of FIG. 3.
Figure 6:
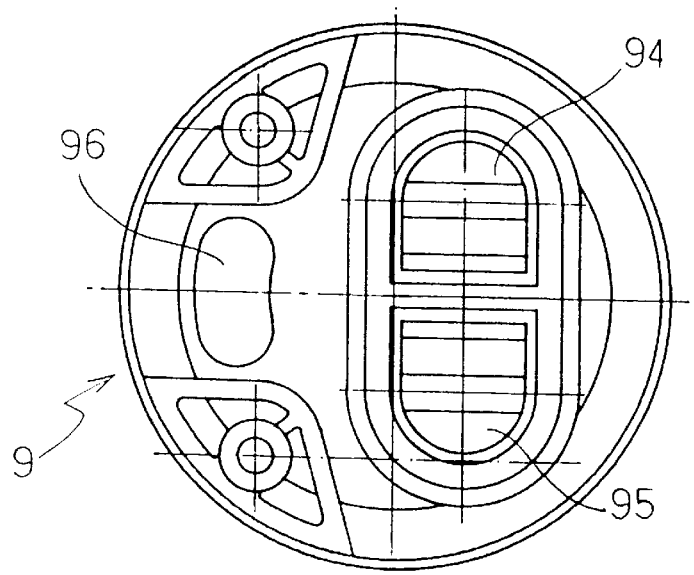
FIG. 6 is a bottom view of the cartridge of the present invention.
Figure 9:
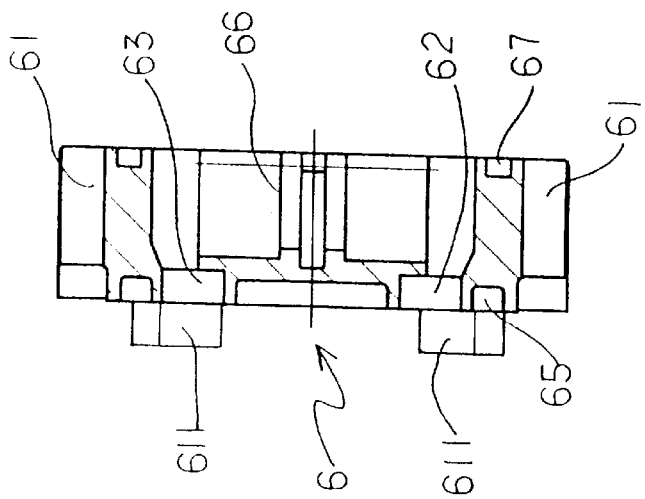
FIG. 9 is a sectional view taken along line B—B of FIG. 7.
Figure 7:
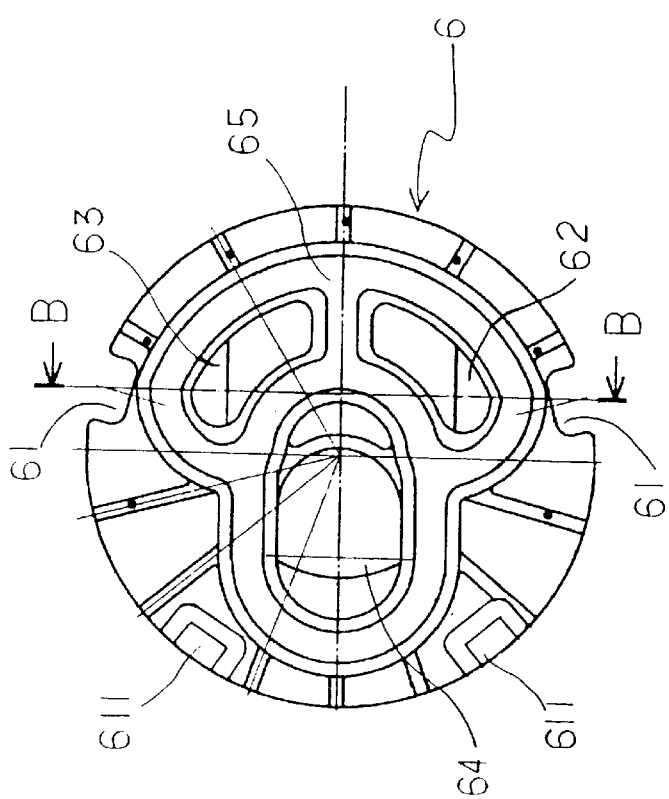
FIG. 7 is a top view of the balance valve cover board of the present invention.
Figure 8:
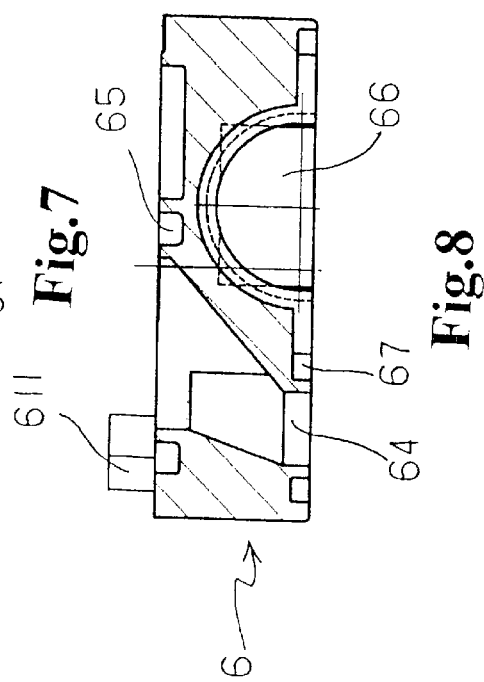
FIG. 8 is a totally sectional view according to FIG. 7.
Figure 10:
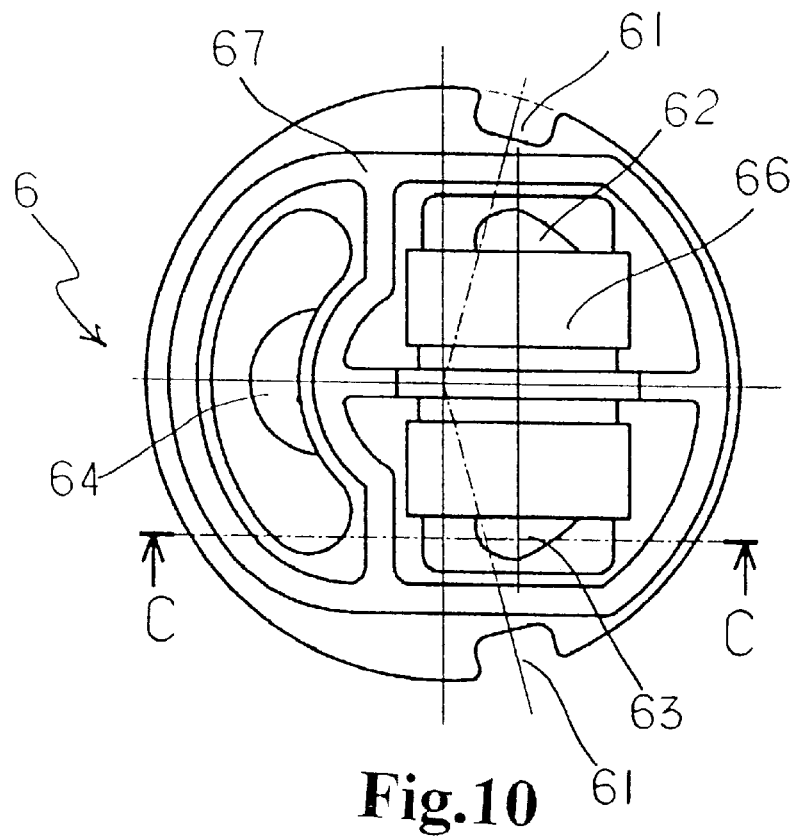
FIG. 10 is a bottom view of the balance valve cover board of the present invention.
Figure 11:
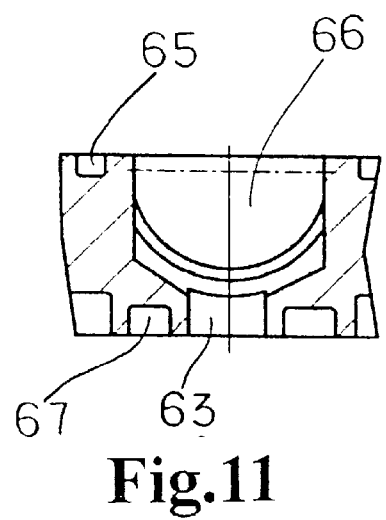
FIG. 11 is a partially sectional view taken along line C—C of FIG. 10.

Please refer to FIGS. 1 and 2. The present invention includes a cartridge cap 1, a rocking lever control device 2 composed of a rocking lever, rocking lever seat, adapter cap and a seal, a movable disc 3, a fixed disc 4, a disc seal 5, a balance valve cover board 6, a balance valve seal 7, a balance valve 8 and a cartridge 9. Referring to FIGS. 3 to 7, the upper edge of the peripheral wall of the cartridge 9 is formed with latch holes 91 for latching with latch hooks 11 of the cartridge cap 1. The bottom wall 92 of the cartridge 9 is formed with a cold and a hot water incoming holes 94, 95 and a mixing water outgoing hole 96. The bottom wall 92 is formed with a lower balance valve cavity 97 on the cold and hot water incoming holes 94, 95. Guide rails 991 are disposed on the peripheral wall face of the cartridge and upward extend from the periphery of the bottom wall 92.

Referring to FIGS. 8 to 11, the balance valve cover board 6 is a circular board formed with a peripheral guide channel 61 cooperating with the guide rails 991 of the cartridge. The balance valve cover board 6 is fixedly fitted on the upper surface of the bottom wall 92 of the cartridge. The balance valve cover board 6 is formed with a cold and a hot water incoming holes 62, 63 and a mixing water outgoing hole 64 corresponding to the water holes of the bottom wall 92 of the cartridge 9. In addition, the upper surface of the balance valve cover board 6 is formed with a sealing groove 65 extending along the edges of the water holes 62, 63, 64 and spaced from the edges by a certain distance. Guide rails 611 upward extend from the upper surface of the edge of the cover board. The lower surface of the cover board 6 is formed with an upper balance valve cavity 66 at the cold and hot water incoming holes 62, 63. In addition, the lower surface of the balance valve cover board 6 is formed with a sealing groove 67 extending along the edges of the water outgoing holes 64 and the upper balance valve cavity 66. The depth of the upper balance valve cavity 66 is slightly larger than the outer radius of the balance valve 8 and the depth of the sealing groove 67 is slightly larger than the radius of the balance valve seal 7. Accordingly, when assembled, the seal 7 and the balance valve 8 can be previously inserted and located in the groove 68 and the lower cavity 66 so that the components can be accurately located to facilitate the assembling operation.

When assembled, the central ring 71 of the balance valve seal 7 is fitted around a middle section of the cylindrical body of the balance valve 8. Then the balance valve seal 7 and the balance valve 8 are inserted in the sealing groove 67 and lower balance valve cavity 66 of the lower surface of the balance valve cover board 6. Then the disc seal 5 is fitted into the sealing groove 65 of the upper surface of the cover board. Then, the cartridge 9 is reversed and the cover board 6, seals 5, 7 and the balance valve 8 are together pushed to the bottom wall 92 of the cartridge, whereby a lower half section of the balance valve 8 is inserted into the lower cavity 97 of the bottom wall 92 and located therein. Then the fixed disc 4 via the guide channels 41 cooperating with the guide rails 991, 611 of the cartridge and the balance valve cover board 6 is fitted and located in the cartridge 9 to press the disc seal 5. The movable disc 3 is sealedly overlaid on the fixed disc 4 with its upper end face fitted under the rocking lever control device 2. The rocking lever seat of the control device 2 is fitted on the cartridge cap 1 which is latched with the upper end of the cartridge 9. When the balance valve cover board 6 is fixedly fitted on the upper surface of the bottom wall 92 of the cartridge, the balance valve seal 7 is positioned in the sealing groove 67 and pressed by the bottom wall 92 of the cartridge, whereby the lower balance valve cavity 97 of the cartridge and the upper balance valve cavity 66 of the balance valve cover board 6 together form a leakproof space in which the balance valve 8 is accommodated.

It should be noted that the above description and accompanying drawings are only used to illustrate some embodiments of the present invention, not intended to limit the scope thereof. Any modification of the embodiments should fall within the scope of the present invention.

What is claimed is:

1. An assembling structure for balance valve of cold/hot water mixing valve, the assembling structure comprising a cartridge cap, a rocking lever control device composed of a rocking lever, rocking lever seat, adapter cap and a seal, a movable disc, a fixed disc, a disc seal, a balance valve cover board, a balance valve seal, a balance valve and a cartridge, the above components being sequentially fitted with each other from upper side to lower side, said assembling structure being characterized in that an upper surface of the bottom wall of the cartridge is formed with a cold and a hot water incoming holes and a mixing water outgoing hole, a lower balance valve cavity being formed on the cold and hot water incoming holes, the balance valve cover board being a circular board formed with a cold and a hot water incoming holes and a mixing water outgoing hole corresponding to the water holes of the bottom wall of the cartridge, a lower surface of the cover board being formed with an upper balance valve cavity at the cold and hot water incoming holes thereof, the lower surface of the cover board being formed with a sealing groove extending along the edges of the water outgoing holes and the upper balance valve cavity, whereby when the balance valve cover board is fixedly fitted on the upper surface of the bottom wall of the cartridge, the balance valve seal is positioned in the sealing groove and pressed by the bottom wall of the cartridge, whereby the lower balance valve cavity of the cartridge and the upper balance valve cavity of the balance valve cover board together form a leakproof space in which the balance valve is sealedly accommodated.

2. An assembling structure as claimed in claim 1, wherein the depth of the upper balance valve cavity of the balance valve cover board is slightly larger than the outer radius of the balance valve.

3. An assembling structure as claimed in claim 1, wherein the depth of the sealing groove of the balance valve cover board is slightly larger than the radius of the balance valve seal.

* * * * *